Aug. 22, 1944.  R. J. PELUNIS  2,356,267
ACTIVATED GAUGE GLASS REFRACTOR
Filed June 6, 1942
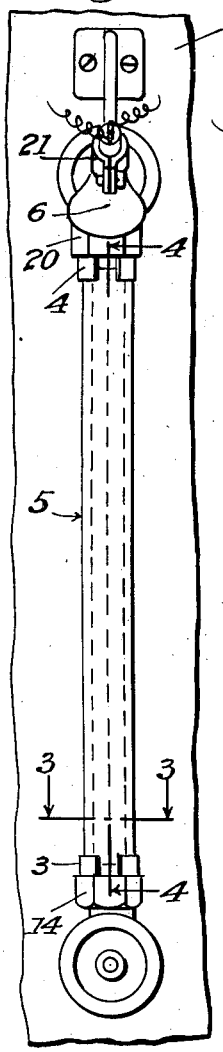
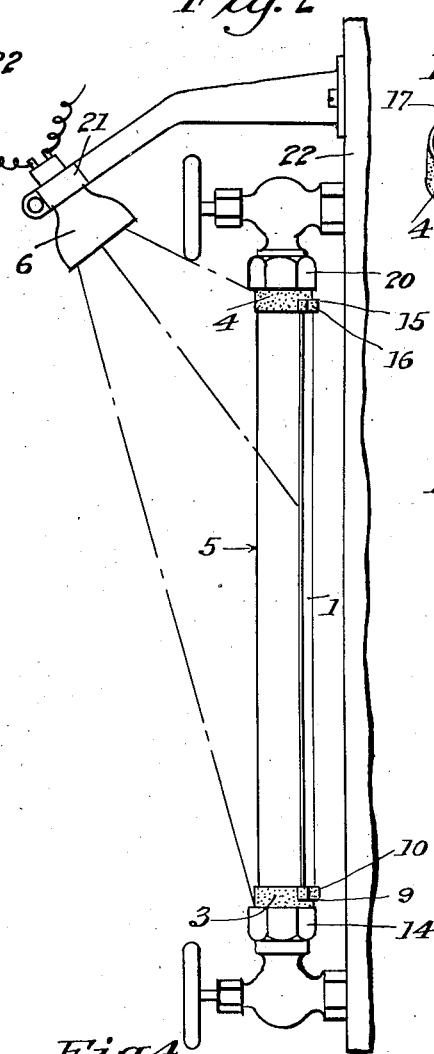
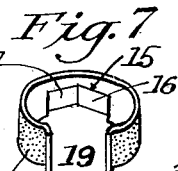
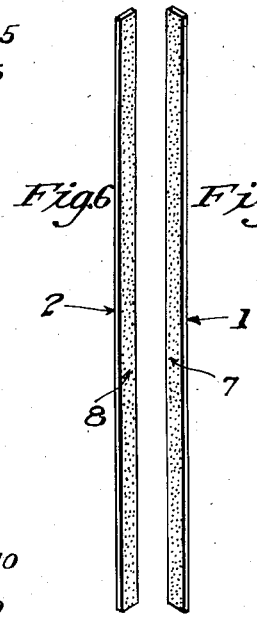
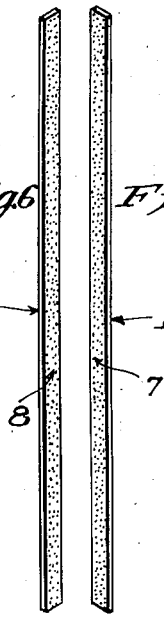
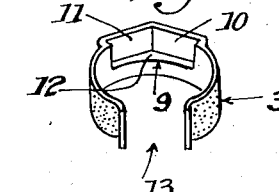
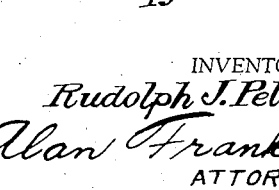
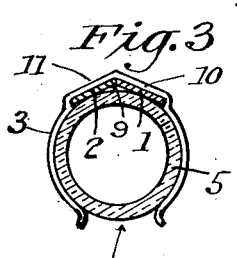
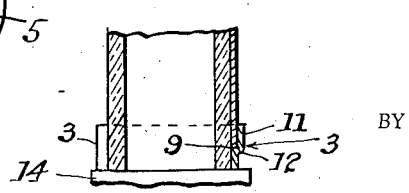
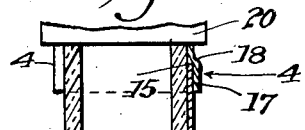
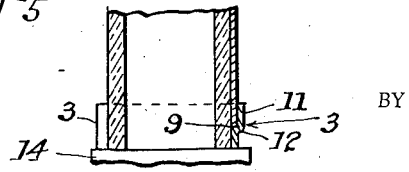
INVENTOR:
Rudolph J. Pelunis,
BY Alan Franklin
ATTORNEY.

Patented Aug. 22, 1944

2,356,267

UNITED STATES PATENT OFFICE 2,356,267

ACTIVATED GAUGE GLASS REFRACTOR

Rudolph J. Pelunis, Los Angeles, Calif.

Application June 6, 1942, Serial No. 446,097

5 Claims. (Cl. 250—72)

This invention relates to illuminating devices, and more particularly to an activated gauge glass refractor, and among the objects of the invention are the following:

To enable easier reading of the water level in the gauge glass.

To present an ever-ready luminous background, regardless of light conditions.

To enable reading of the gauge glass during blackout, emergency, or war conditions, without the presence of ordinary artificial light which is visible from the outside of buildings not protected by blackout paints, shades or blinds.

To serve as an aid in protecting property and life, under many conditions under which it acts efficiently.

Other objects will appear hereinafter as this specification progresses.

The invention is illustrated in the annexed drawing which forms a part of this specification and in which:

Fig. 1 is a front elevation of my invention shown applied to a steam boiler gauge glass.

Fig. 2 is a side elevation of Fig. 1.

Fig. 3 is a horizontal section on an enlarged scale of Fig. 1 taken on line 3—3 of Fig. 1.

Fig. 4 is a vertical longitudinal section of Fig. 1 on an enlarged scale taken on line 4—4 of Fig. 1.

Fig. 5 is a perspective of the fluorescent strip.

Fig. 6 is a perspective of the phosphorescent strip.

Fig. 7 is a front perspective of the upper clamp band.

Fig. 8 is a rear perspective of said upper clamp band.

Fig. 9 is a front perspective of the lower clamp band.

Referring more particularly to the drawing, in which corresponding parts are designated by the same reference characters in all of the figures, my invention, as illustrated, includes a fluorescent strip 1 and a phosphorescent strip 2, two split spring clamp bands 3 and 4 for respectively clamping the lower ends and the upper ends of said strips to the rear side of a gauge glass 5, and a directed light, preferably an ultraviolet light 6 for projecting its rays through said gauge glass onto said fluorescent strip 1 and phosphorescent strip 2.

The strips 1 and 2 may be of any suitable material, such as metal, and the width of each of said strips is determined by the diameter of the gauge glass, bearing the proportion of $$\frac{\text{diameter of glass}}{2}$$

e. g., a ¾" gauge requires a ⅜" strip. The strip 1 is treated and coated with a fluorescent material 7, which may be in the form of baked enamel, and the best color for the purpose of the strip is red, although a few other colors may be used, while the strip 2 is treated and coated with a phosphorescent material 8, which also may be in the form of baked enamel, and may be green, blue or some other suitable color.

The lower clamp band 3 is offset outwardly at its rear in the form of a V-shaped seat 9, with vertical walls 10 and 11, disposed at an angle to each other, and a bottom wall 12, in which seat are received the lower ends of the strips 1 and 2, said seat extending downwardly from the upper edge of said clamp band for a portion of its width. Said clamp band 3 is split at the front thereof, as at 13, opposite said seat 9 in the rear of said band, so that the ends of said clamp band may be spread apart and sprung over and upon the lower end of the gauge glass 5 adjacent the lower coupling 14 of said gauge glass, whereby the lower ends of the strips 1 and 2 in the band seat 9 are clamped by said clamp band in operative position against the rear of said gauge glass. The band 3 may be treated and coated with a phosphorescent material, which may be in the form of baked enamel.

The upper clamp band 4 is offset outwardly at its rear in the form of a V-shaped seat 15, with vertical walls 16 and 17, disposed at an angle to each other and an upper wall 18, in which seat are received the upper ends of the strips 1 and 2, said seat extending upwardly from the lower edge of said clamp band for a portion of its width. Said clamp band 4 is split at the front thereof, as at 19, opposite said seat 15 in the rear of said band, so that the ends of said clamp band may be spread apart and sprung over and upon the upper end of gauge glass 5 adjacent the upper coupling 20 of said gauge glass, whereby the upper ends of the strips 1 and 2 in the band seat 15 are clamped by said clamp band in operative position against the rear of the gauge glass. The band 4 may be treated and coated with a phosphorescent material which may be in the form of baked enamel.

The ultraviolet light 6 may be of any suitable type, such as the General Electric 2½ W. Argon, because of its economy in initial cost and low consumption of wattage, and said light may be mounted in a clamp bracket 21 secured to a suitable support, such as the boiler 22 to which the gauge glass 5 is connected, so that said light will project its ultraviolet rays upon and through the gauge glass 5 and upon the fluorescent strip 1 and phosphorescent strip 2 on the rear of said gauge glass, and will also project its rays upon the clamp bands 3 and 4.

The operation of my invention is as follows:

Behind ordinary light, (natural sunlight or incandescent light) the fluorescent strip 1 is rendered more brilliant along its entire length. Due to refraction, the narrow strip 1 appears to color the water in the gauge glass completely up to its level. Above the water level the narrow strip is visible as such. The phosphorescent strip 2, as the light continues to shine upon it, accumulates activation, so that, upon total extinguishing of light, it emits an afterglow by which the water level in the gauge glass may be read for an extended period, varying from a few minutes to several hours, depending upon the type of material used, for example green, blue or some other material, length of activation, intensity of light and other factors.

Behind ultra-violet light, such as the light 6, and in the complete absence of other types of light, the fluorescent strip 1 is most brilliant and acts the same as with ordinary light, as above described, while the phosphorescent strip 2 glows intensely in its characteristic afterglow color, and acts likewise as with ordinary light as above described. When the ultraviolet light is also extinguished the fluorescent strip 1 becomes invisible, while the phosphorescent strip 2 continues to emit an afterglow, as above described.

The phosphorescent clamp bands 3 and 4, activated by the light, serve to indicate in the dark, or under any other condition of lighting, the extremities of the gauge, and make readings of the gauge easier by such comparative indicators.

I do not limit my invention to the exact construction herein disclosed, since various changes may be made therein without departing from the spirit of the invention.

I claim:

1. A gauge glass illuminating device including the combination of a gauge glass, a strip of fluorescent material and a strip of phosphorescent material mounted adjacent the gauge glass, and an ultraviolet light arranged to project its rays through said gauge glass onto said strips.

2. A gauge glass illuminating device including the combination of a gauge glass, an illuminating strip, illuminating clamp bands extending around said gauge glass and over the ends, respectively, of said strip for holding said strip adjacent said gauge glass, and a light arranged to project its rays onto said illuminating bands and through said gauge glass onto said illuminating strip.

3. A gauge glass illuminating device including the combination of a gauge glass, an illuminating strip, phosphorescent clamp bands extending around said gauge glass and over the ends, respectively, of said illuminating strip for holding said illuminating strip adjacent said gauge glass, and a light arranged to project its rays onto said phosphorescent bands and through said gauge glass onto said illuminating strip.

4. A gauge glass illuminating device, including the combination of a gauge glass, an illuminating strip, a lower clamp band formed with a seat to receive the lower end of said strip, and extended over said gauge glass to hold said lower end of said strip adjacent said gauge glass, an upper clamp band formed with a seat to receive the upper end of said strip, and extended over said gauge glass to hold the upper end of said strip adjacent said gauge glass, and a light arranged to project its rays through said gauge glass onto said illuminating strip.

5. A gauge glass illuminating device including the combination of a gauge glass, an illuminating strip, clamp bands extending around said gauge glass and over the ends, respectively, of said strip for holding said strip adjacent said gauge glass, said clamp bands being treated with a material adapted to be activated by light, and a light arranged to project its rays through said gauge glass onto said illuminating strip, and to project its rays onto said clamp bands and said light-activated material on said bands.

RUDOLPH J. PELUNIS.